United States Patent
Yu et al.

(10) Patent No.: US 9,215,037 B2
(45) Date of Patent: Dec. 15, 2015

(54) RECEIVING METHOD, APPARATUS, AND SYSTEM IN COOPERATIVE COMMUNICATIONS

(71) Applicant: HUAWEI TECHNOLOGIES CO., LTD., Shenzhen, Guangdong (CN)

(72) Inventors: Rongdao Yu, Shenzhen (CN); Sheng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/561,220

(22) Filed: Dec. 5, 2014

(65) Prior Publication Data

US 2015/0172002 A1 Jun. 18, 2015

Related U.S. Application Data

(60) Division of application No. 13/779,332, filed on Feb. 27, 2013, now Pat. No. 8,953,717, which is a continuation of application No. PCT/CN2011/071462, filed on Mar. 2, 2011.

(30) Foreign Application Priority Data

Aug. 27, 2010 (CN) .......................... 2010 1 0264815

(51) Int. Cl.
*H04L 27/00* (2006.01)
*H03K 9/00* (2006.01)
*H04L 1/00* (2006.01)

(52) U.S. Cl.
CPC .............. *H04L 1/0054* (2013.01); *H04L 1/005* (2013.01); *H04L 1/0076* (2013.01); *H04L 1/0077* (2013.01); *H04L 1/0066* (2013.01); *H04L 2001/0097* (2013.01)

(58) Field of Classification Search
CPC ...... H04L 1/005; H04L 1/0054; H04L 1/0066
USPC ................................... 375/211, 316, 324, 341
See application file for complete search history.

(56) References Cited

U.S. PATENT DOCUMENTS 8,358,679 B2 * 1/2013 Zeitler et al. ................. 375/211
2007/0184826 A1 8/2007 Park et al.
(Continued)

FOREIGN PATENT DOCUMENTS

| CN | 101567761 A | 10/2009 |
|---|---|---|
| EP | 2202894 A1 | 6/2010 |
| WO | 2010005181 A2 | 1/2010 |

OTHER PUBLICATIONS

Chaoxi Fang:"Cooperative Transmission in Wireless Communication Systems", PhD Thesis, Fudan University, Nov. 15, 2009, with English translation total 18 pages.

(Continued)

*Primary Examiner* — Freshteh N Aghdam
(74) *Attorney, Agent, or Firm* — Huawei Technologies Co., Ltd.

(57) ABSTRACT

The application provides a receiving method in cooperative communications. A signal-receiving node demodulates a first signal received from a local end to obtain a first log-likelihood ratio. The signal-receiving node further demodulates a second signal received from a relay node to obtain a second log-likelihood ratio. The second signal is a signal obtained by the relay node through network coding the first signal and a third signal received from a peer end. The signal-receiving node calculates a prior log-likelihood ratio according to the first log-likelihood ratio and the second log-likelihood ratio, and decodes the second signal by using the prior log-likelihood ratio to obtain the third signal.

6 Claims, 15 Drawing Sheets

(56) References Cited

U.S. PATENT DOCUMENTS

| | | | |
|---|---|---|---|
| 2008/0244360 A1* | 10/2008 | Mokhlesi et al. | 714/758 |
| 2009/0252146 A1 | 10/2009 | Luo et al. | |
| 2010/0074166 A1 | 3/2010 | Hwang | |
| 2010/0124186 A1 | 5/2010 | Josiam et al. | |
| 2011/0041041 A1 | 2/2011 | Kim | |
| 2014/0133610 A1* | 5/2014 | Lee et al. | 375/346 |

OTHER PUBLICATIONS

T. Koike-Akino et al., "Optimized constellations for two-way wireless relaying with physical networks coding", IEEE Journal on Selected Areas in Communication, vol. 27, No. 5, Jun. 2009, total 16 pages.

* cited by examiner

RECEIVING METHOD, APPARATUS, AND SYSTEM IN COOPERATIVE COMMUNICATIONS

CROSS REFERENCE TO RELATED APPLICATIONS

This application is a divisional application of U.S. patent application Ser. No. 13/779,332, filed on Feb. 27, 2013, which is a continuation of International Application No. PCT/CN2011/071462, filed on Mar. 2, 2011. The International Application claims priority to Chinese Patent Application No. 201010264815.2, filed on Aug. 27, 2010. The afore-mentioned patent applications are hereby incorporated by reference in their entireties.

TECHNICAL FIELD

The present invention relates to the communications field, and in particular, to a receiving method, an apparatus, and a system in cooperative communications.

BACKGROUND

The idea of cooperative communications is rooted from relay communications. In cooperative communications, a user cooperates with other relay nodes to transmit information, ensuring communication between the user and a destination node. Relay-based next-generation network architecture has become the hot spot for research. By using cooperative transmission technology, it supports direct communication between a source node and a destination node. In addition, by introducing one or more relay nodes, it allows information sent from the source node to reach the destination node after being processed by the relay nodes in a certain manner. This multi-hop transmission manner bypasses obstacles that block electrical wave transmission such as buildings, overcomes the impact of large-scale fading to a certain extent, reduces path losses between sending and receiving terminals, and lowers the transmit power of the devices, thereby suppressing system interference and improving the signal-to-noise ratio of signals. In addition, because the destination node may perform receiving processing on signals from different transmitting nodes according to different combination manners, cooperative transmission may further apparently resist the impact of small-scale fading on channels, improving the transmission environment for signals to a certain extent and yielding different diversity gains.

Network coding is an information switching technology that integrates routing and coding. Its principle is to perform linear or non-linear processing on information received from each channel on each node on the network and forward the information to downstream nodes. If network coding is used, intermediate nodes on the network do not simply perform storage or forwarding, but encode received information and send the encoded information, thereby improving the network capacity and robustness. By combining network coding and cooperative communications in an organic manner, the system performance may be further improved.

In the existing technical solutions for combining network coding and cooperative communications, however, the receiving end uses an estimate obtained by decoding received signals for network decoding. In this manner, if more than one of the estimates at the receiving end is incorrect, all received information fails to be output through a network decoding way. According to the existing technical solutions, network coding is not fully utilized to yield diversity gains, and the system performance is not high.

SUMMARY

Embodiments of the present invention provide a receiving method, an apparatus, and a system in cooperative communications to obtain diversity gains by making full use of network coding and improve the system performance.

An embodiment of the present invention provides a receiving method in cooperative communications. The method includes: demodulating a signal transmitted by a first source end that is received to obtain a first log-likelihood ratio; demodulating a signal transmitted by a second source end that is received to obtain a second log-likelihood ratio; demodulating a signal transmitted by a relay node that is received to obtain a third log-likelihood ratio; where, the signal transmitted by the relay node is a signal obtained after the relay node performs network coding on the signal transmitted by the first source end and the signal transmitted by the second source end; based on an exclusive OR feature of network coding, processing the first log-likelihood ratio, the second log-likelihood ratio, and the third log-likelihood ratio to obtain a posterior log-likelihood ratio of the first source end; and decoding the signal transmitted by the first source end that is received by using the posterior log-likelihood ratio of the first source end.

An embodiment of the present invention provides a receiving method in cooperative communications. The method includes: demodulating a signal transmitted by a relay node that is received to obtain a third log-likelihood ratio; where, the signal transmitted by the relay node is a signal obtained after the relay node performs network coding on a signal transmitted by a local end and a signal transmitted by a peer end; based on an exclusive OR feature of network coding, performing joint processing on the third log-likelihood ratio and the first log-likelihood ratio of the local end to obtain a prior log-likelihood ratio of the peer end; where, the first log-likelihood ratio is obtained in advance according to the signal transmitted by the local end; and decoding the signal transmitted by the relay node that is received by using the prior log-likelihood ratio of the peer end to obtain a signal transmitted by the peer end.

An embodiment of the present invention provides a receiving apparatus in cooperative communications. The apparatus includes: a first demodulating module configured to demodulate a signal transmitted by a first source end that is received to obtain a first log-likelihood ratio; a second demodulating module configured to demodulate a signal transmitted by a second source end that is received to obtain a second log-likelihood ratio; a third demodulating module configured to demodulate a signal transmitted by a relay node that is received to obtain a third log-likelihood ratio; where, the signal transmitted by the relay node is a signal obtained after the relay node performs network coding on the signal transmitted by the first source end and the signal transmitted by the second source end; a processing module configured to: based on an exclusive OR feature of network coding, process the first log-likelihood ratio, the second log-likelihood ratio, and the third log-likelihood ratio to obtain a posterior log-likelihood ratio of the first source end; and a decoding module configured to decode the signal transmitted by the first source end that is received by using the posterior log-likelihood ratio of the first source end.

An embodiment of the present invention provides a source end apparatus, including: a likelihood ratio demodulating module configured to demodulate a signal transmitted by a relay node that is received to obtain a third log-likelihood ratio; where, the signal transmitted by the relay node is a signal obtained after the relay node performs network coding on a signal transmitted by the source end apparatus and a signal transmitted by a peer end of the source end apparatus; a likelihood ratio obtaining module configured to: based on an exclusive OR feature of network coding, perform joint processing on the third log-likelihood ratio and the first log-likelihood ratio of the source end apparatus to obtain a prior log-likelihood ratio of the peer end of the source end apparatus; where, the first log-likelihood ratio is obtained in advance according to a signal transmitted by the source end apparatus; and a decoding processing module configured to decode the signal transmitted by the relay node that is received by using the prior log-likelihood ratio of the peer end of the source end apparatus to obtain a signal transmitted by the peer end of the source end apparatus to obtain a signal transmitted by the peer end of the source end apparatus.

An embodiment of the present invention provides a cooperation communication system, including a first source end, a second source end, a relay node, and a receiving apparatus.

The first source node is configured to transmit a signal to the relay node and the receiving apparatus.

The second source node is configured to transmit a signal to the relay node and the receiving apparatus.

The relay node is configured to demodulate received signals transmitted by the first source end and the second source end, perform network coding on the two demodulated signals, encode and modulate the signals after the network coding, and send them to the receiving apparatus.

The receiving apparatus is configured to: demodulate a signal transmitted by the first source end that is received to obtain a first log-likelihood ratio; demodulate a signal transmitted by the second source end that is received to obtain a second log-likelihood ratio; demodulate a signal transmitted by the relay node that is received to obtain a third log-likelihood ratio; based on an exclusive OR feature of network coding, process the first log-likelihood ratio, the second log-likelihood ratio, and the third log-likelihood ratio to obtain a posterior log-likelihood ratio of the first source end; and decode the signal transmitted by the first source end that is received by using the posterior log-likelihood ratio of the first source end.

According to the technical solutions in the embodiments, for a cooperative communications system where a relay node adopts network coding, based on the exclusive OR feature of network coding, a posterior log-likelihood ratio of a source end or a prior log-likelihood ratio of a peer end is obtained, and the posterior log-likelihood ratio of the source end or the prior log-likelihood ratio of the peer end is used to decode received data. In this manner, the characteristics of network coding are fully utilized, yielding more diversity gains, and greatly improving the system performance.

BRIEF DESCRIPTION OF THE DRAWINGS

To make the technical solutions of the embodiments of the present invention or the prior art clearer, the accompanying drawings used in the description of the embodiments or the prior art are briefly described hereunder. Evidently, the accompanying drawings illustrate some exemplary embodiments of the present invention and persons of ordinary skill in the art may obtain other drawings based on these drawings without creative efforts.

DETAILED DESCRIPTION

The technical solutions in the embodiments of the present invention are hereinafter described clearly and completely with reference to the accompanying drawings. Apparently, the described embodiments are only some embodiments of the present invention, rather than all the embodiments of the present invention. Based on the embodiments of the present invention, all other embodiments obtained by persons of ordinary skill in the art without making any creative effort shall fall within the protection scope of the present invention.

To help persons of ordinary skills in the art better understand the technical solutions provided in these embodiments, certain related technologies are described in the embodiments.

Figure 1:
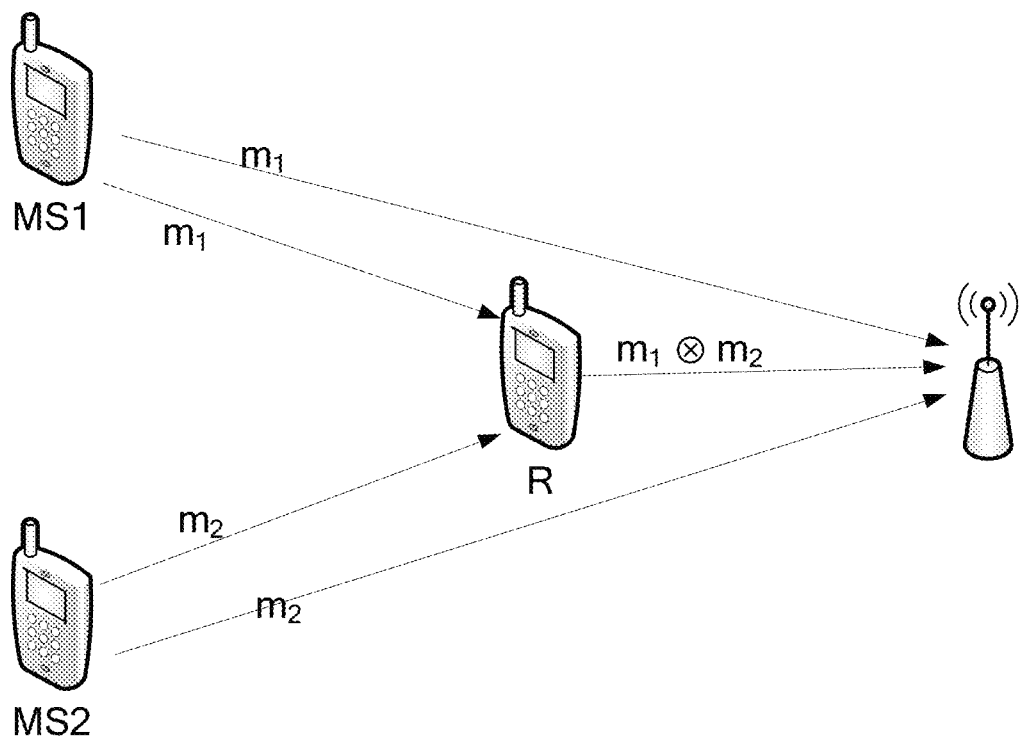
FIG. 1 is a schematic structural diagram of a cooperative communications system according to an embodiment of the present invention.

FIG. 1 is a schematic structural diagram of a cooperative communications system according to an embodiment of the present invention. Without loss of generality, two terminals MS1 and MS2, one relay node R, and one base station BS are considered, where the relay node R helps the terminals communicate with the base station. The transmission process is divided into two phases. In the first phase, terminals MS1 and MS2 broadcast messages $m_1$ and $m_2$, respectively, to the relay node R and the base station BS. In the second phase, the relay node R demodulates and decodes received signals sent by MS1 and MS2, and forwards two decoded signals to the base station by using a network coding way (that is, $m_3 = m_1 \otimes m_2$).

Figure 2:
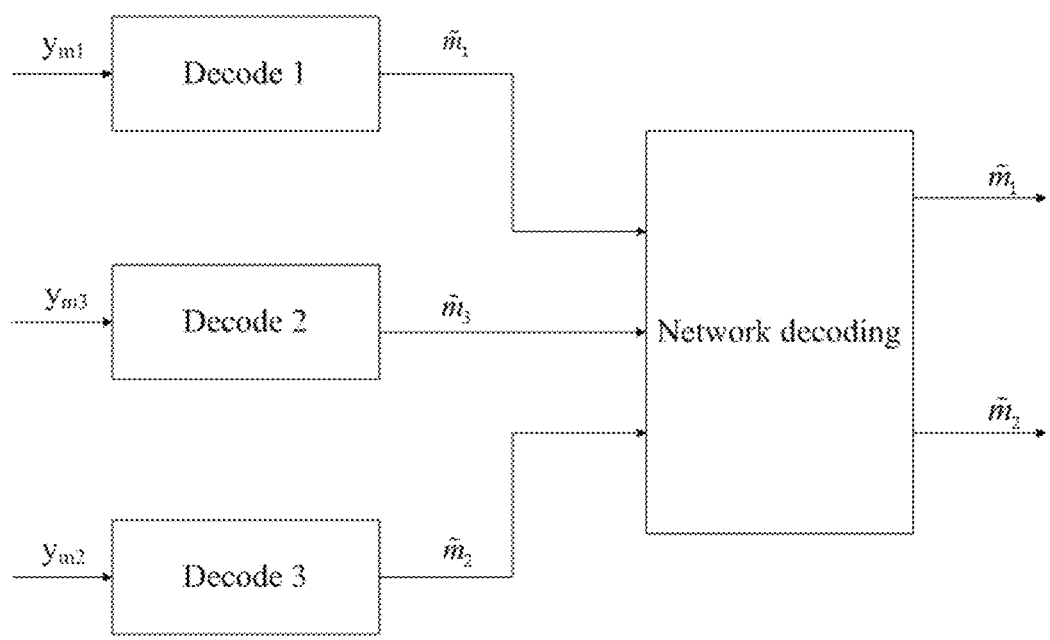
FIG. 2 is a schematic structural diagram of a cooperative communications system according to an embodiment of the present invention.

As shown in FIG. 2, after transmission in the two phases, the base station receives a total of three signals: ym1 received from MS1, ym2 from MS2, and ym3 from the relay node R. The BS decodes the three received signals to obtain three estimates: $\tilde{m}_1$ $\tilde{m}_2$ $\tilde{m}_3$, and then performs network decoding. If two estimates are correct, but the other estimate is incorrect, the other signal may be correctly decoded through a network decoding way. For example, if $\tilde{m}_1$ and $\tilde{m}_3$ are correct, but $\tilde{m}_2$ is incorrect, an estimate of the information sent by MS2 may be obtained through a network decoding way $\hat{m}_2 = \tilde{m}_1 \otimes \tilde{m}_3$.

If, however, all three signals are decoded incorrectly, no information may be correctly output through a network decoding way; if two of the three signals are decoded incorrectly and the other one is decoded correctly, the two signals cannot be correctly decoded through a network decoding way. In this manner, according to the technical solution, network coding is not fully utilized to yield diversity gains, and the system performance is not high.

Figure 3:
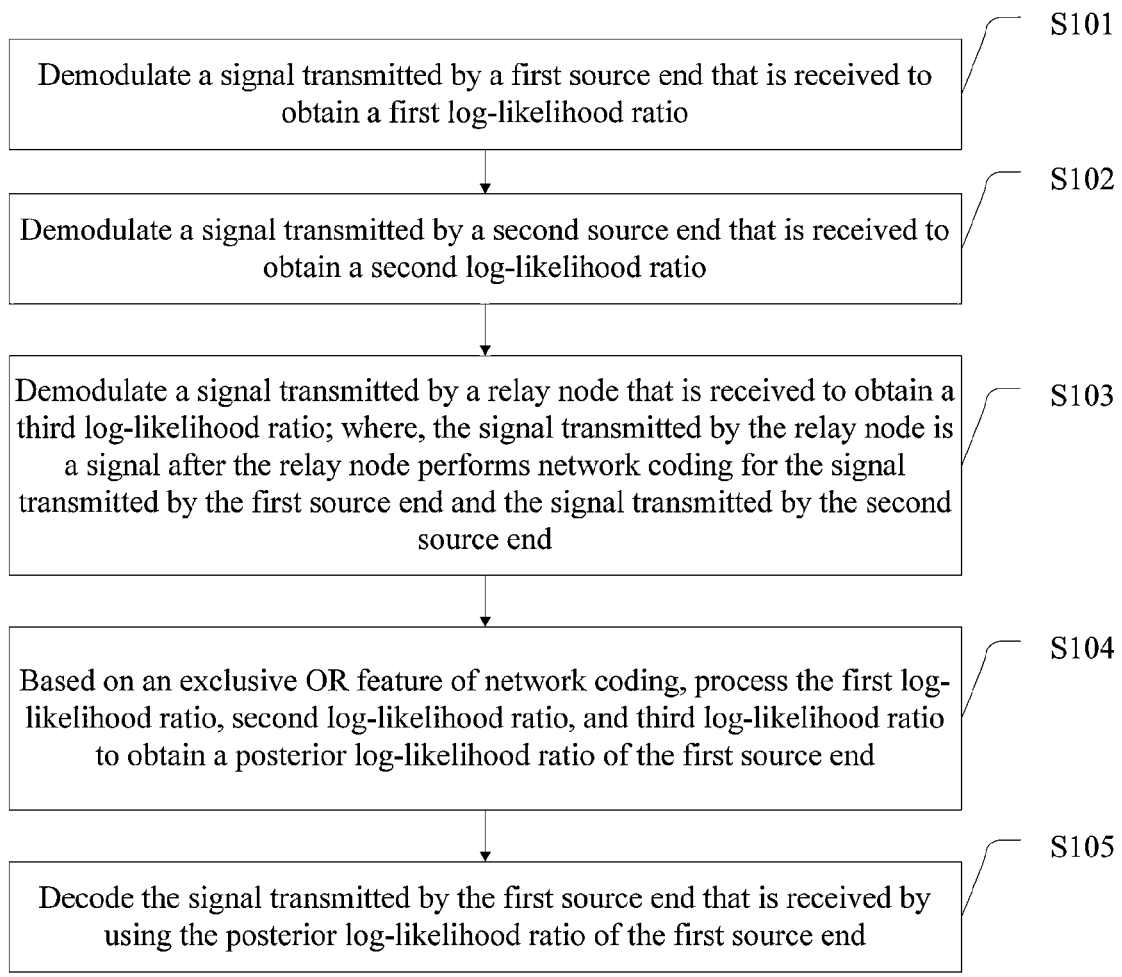
FIG. 3 is a flow chart of a receiving method in cooperative communications according to an embodiment of the present invention.

As shown in FIG. 3, an embodiment of the present invention provides a receiving method in cooperative communications. The method includes the following steps:

S101: Demodulate a signal transmitted by a first source end that is received to obtain a first log-likelihood ratio.

S102: Demodulate a signal transmitted by a second source end that is received to obtain a second log-likelihood ratio.

S103: Demodulate a signal transmitted by a relay node that is received to obtain a third log-likelihood ratio; where, the signal transmitted by the relay node is a signal obtained after the relay node performs network coding on the signal transmitted by the first source end and the signal transmitted by the second source end.

S104: Based on an exclusive OR feature of network coding, process the first log-likelihood ratio, the second log-likelihood ratio, and the third log-likelihood ratio to obtain a posterior log-likelihood ratio of the first source end.

S105: Decode the signal transmitted by the first source end that is received by using the posterior log-likelihood ratio of the first source end.

It should be noted that the process of decoding the signal transmitted by the second source end that is received is similar to the preceding process, and is not described herein.

According to the technical solution in the embodiment, for a cooperative communications system where a relay node adopts network coding, based on the exclusive OR feature of network coding, a posterior log-likelihood ratio of a source end is obtained, and the posterior log-likelihood ratio of the source end is used to decode received source end data. In this manner, the characteristics of network coding are fully utilized, yielding more diversity gains, and greatly improving the system performance.

Figure 4:
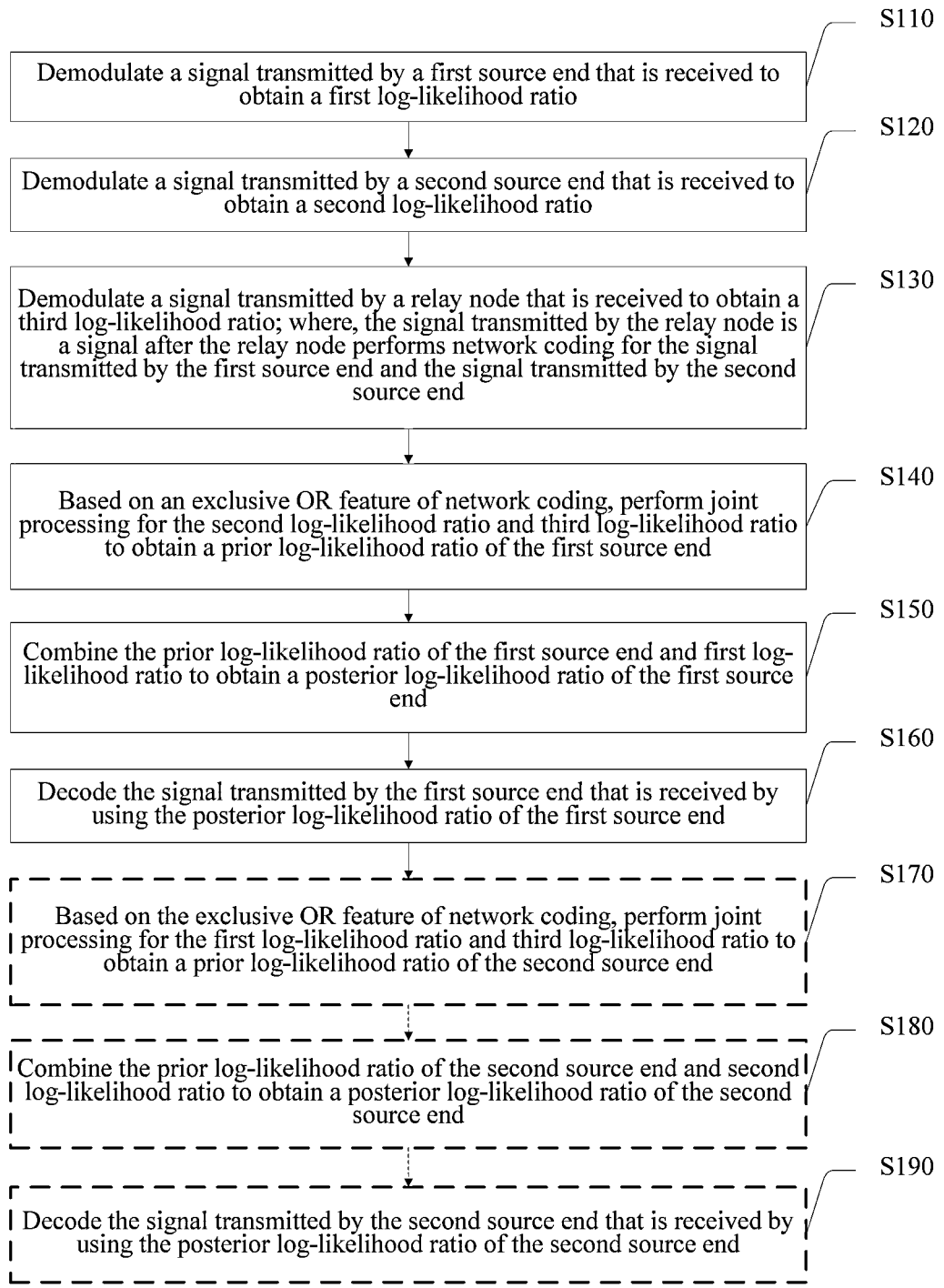
FIG. 4 is a flow chart of a receiving method in cooperative communications according to an embodiment of the present invention.

As shown in FIG. 4, an embodiment of the present invention provides a receiving method in cooperative communications. The method includes the following steps:

S110: Demodulate a signal transmitted by a first source end that is received to obtain a first log-likelihood ratio.

S120: Demodulate a signal transmitted by a second source end that is received to obtain a second log-likelihood ratio.

S103: Demodulate a signal transmitted by a relay node that is received to obtain a third log-likelihood ratio; where, the signal transmitted by the relay node is a signal obtained after the relay node performs network coding on the signal transmitted by the first source end and the signal transmitted by the second source end.

S140: Based on an exclusive OR feature of network coding, perform joint processing on the second log-likelihood ratio and third log-likelihood ratio to obtain a prior log-likelihood ratio of the first source end.

S150: Combine the prior log-likelihood ratio of the first source end and the first log-likelihood ratio to obtain a posterior log-likelihood ratio of the first source end.

S160: Decode the signal transmitted by the first source end that is received by using the posterior log-likelihood ratio of the first source end.

It should be noted that the process of decoding the signal transmitted by the second source end is similar to the process of decoding the signal transmitted by the first source end. As shown in the dashed box in FIG. 4, in an embodiment, the method may further include the following:

S170: Based on the exclusive OR feature of network coding, perform joint processing on the first log-likelihood ratio and third log-likelihood ratio to obtain a prior log-likelihood ratio of the second source end.

S180: Combine the prior log-likelihood ratio of the second source end and second log-likelihood ratio to obtain a posterior log-likelihood ratio of the second source end.

S190: Decode the signal transmitted by the second source end that is received by using the posterior log-likelihood ratio of the second source end.

In an embodiment, the technical solution provided in this embodiment may be called the joint network coding channel decoding solution.

Specifically, according to the method in the embodiment, the detailed description is as follows:

In this embodiment, assume that the first log-likelihood ratio is $LLR_{m_1}$, the second log-likelihood ratio is $LLR_{m_2}$, and the third log-likelihood ratio is $LLR_{m_3}$. Make $Pr_{ch}(m_i=0)$ indicate the probability that $m_i$ (i=1, 2, 3) is 0, and $Pr_{ch}(m_i=1)$ indicate the probability that $m_i$ (i=1, 2, 3) is 1. Apparently, $Pr_{ch}(m=1)=1-Pr_{ch}(m=0)$.

$m_1$ and $m_2$ indicate the messages broadcast by the first source end and second source end, respectively, to the relay node R and base station BS in the first phase, that is, indicate the signal transmitted by the first source end and the signal transmitted by the second source end, respectively. $m_3$ indicates the message forwarded by the relay node R by using a network coding way (that is, $m_3=m_1 \otimes m_2$) to the base station after the relay node demodulates and decodes the received signals sent by the first source end and second source end. That is, it is the signal transmitted by the relay node. The specific description is as follows:

Demodulate the received data to obtain each log-likelihood ratio $LLR_{m_i}$. In this case, according to the definition of log-likelihood ratio, the following is obtained:

$$LLR_{m_i} = \log\left(\frac{Pr_{ch}(m_i = 0)}{Pr_{ch}(m_i = 1)}\right) \quad (1)$$
$$= \log\left(\frac{Pr_{ch}(m_i = 0)}{1 - Pr_{ch}(m_i = 0)}\right) (i = 1, 2, 3)$$

Perform logarithm to e at both ends of equation (1) to obtain the following:

$$Pr_{ch}(m_i = 0) = \frac{e^{LLR_{m_i}}}{1 + e^{LLR_{m_i}}} (i = 1, 2, 3) \quad (2)$$

It is easily understood that $Pr_{ch}(m_i=1)=1-Pr_{ch}(m_i=0)$.

Because $m_3$ is the message after networking coding is performed on $m_1$ and $m_2$, according to the exclusive OR feature between $m_1$, $m_2$, and $m_3$ the following may be obtained:

$$Pr_{ch}^{aprior}(m_1 = 0) = Pr_{ch}(m_3 = 0)Pr_{ch}(m_1 = 0 \mid m_3 = 0) + Pr_{ch}(m_3 = 1)Pr_{ch}(m_1 = 0 \mid m_3 = 1) \quad (3)$$

$$= \frac{Pr_{ch}(m_3 = 0)Pr_{ch}(m_1 = 0)Pr_{ch}(m_3 = 0 \mid m_1 = 0)}{Pr_{ch}(m_1 = 0)Pr_{ch}(m_3 = 0 \mid m_1 = 0) + Pr_{ch}(m_1 = 1)Pr_{ch}(m_3 = 0 \mid m_1 = 1)} +$$

$$\frac{Pr_{ch}(m_3 = 1)Pr_{ch}(m_1 = 0)Pr_{ch}(m_3 = 1 \mid m_1 = 0)}{Pr_{ch}(m_1 = 0)Pr_{ch}(m_3 = 1 \mid m_1 = 0) + Pr_{ch}(m_1 = 1)Pr_{ch}(m_3 = 1 \mid m_1 = 1)}$$

$$= \frac{Pr_{ch}(m_1 = 0)Pr_{ch}(m_2 = 0)Pr_{ch}(m_3 = 0)}{Pr_{ch}(m_1 = 0)Pr_{ch}(m_2 = 0) + Pr_{ch}(m_1 = 1)Pr_{ch}(m_2 = 1)} +$$

$$\frac{Pr_{ch}(m_1 = 0)Pr_{ch}(m_2 = 1)Pr_{ch}(m_3 = 1)}{Pr_{ch}(m_1 = 0)Pr_{ch}(m_2 = 1) + Pr_{ch}(m_1 = 1)Pr_{ch}(m_2 = 0)}$$

$Pr_{ch}^{aprior}(m_1=0)$ indicates information about the prior probability that m1 is 0, which is deduced according to the equation $m_3 = m_1 \otimes m_2$. Likewise, information about the prior probability that m1 is 1 as deduced according to the equation $m_3 = m_1 \otimes m_2$ is as follows:

$$Pr_{ch}^{aprior}(m_1 = 1) = Pr_{ch}(m_3 = 0)Pr_{ch}(m_1 = 1 \mid m_3 = 0) + Pr_{ch}(m_3 = 1)Pr_{ch}(m_1 = 1 \mid m_3 = 1) \quad (4)$$

$$= \frac{Pr_{ch}(m_3 = 0)Pr_{ch}(m_1 = 1)Pr_{ch}(m_3 = 0 \mid m_1 = 1)}{Pr_{ch}(m_1 = 1)Pr_{ch}(m_3 = 0 \mid m_1 = 1) + Pr_{ch}(m_1 = 0)Pr_{ch}(m_3 = 0 \mid m_1 = 0)} +$$

$$\frac{Pr_{ch}(m_3 = 1)Pr_{ch}(m_1 = 1)Pr_{ch}(m_3 = 1 \mid m_1 = 1)}{Pr_{ch}(m_1 = 0)Pr_{ch}(m_3 = 1 \mid m_1 = 0) + Pr_{ch}(m_1 = 1)Pr_{ch}(m_3 = 1 \mid m_1 = 1)}$$

$$= \frac{Pr_{ch}(m_1 = 1)Pr_{ch}(m_2 = 1)Pr_{ch}(m_3 = 0)}{Pr_{ch}(m_1 = 0)Pr_{ch}(m_2 = 0) + Pr_{ch}(m_1 = 1)Pr_{ch}(m_2 = 1)} +$$

$$\frac{Pr_{ch}(m_1 = 1)Pr_{ch}(m_2 = 0)Pr_{ch}(m_3 = 1)}{Pr_{ch}(m_1 = 0)Pr_{ch}(m_2 = 1) + Pr_{ch}(m_1 = 1)Pr_{ch}(m_2 = 0)}$$

By combining equations (3) and (4), according to the definition of a log-likelihood ratio, the prior log-likelihood ratio of m1 may be obtained as follows:

$$LLR_{m_1}^{aprior} = \log\left(\frac{Pr_{ch}^{aprior}(m_1 = 0)}{Pr_{ch}^{aprior}(m_1 = 1)}\right) \quad (5)$$

In this case, put equation (2) into equations (3) and (4). Then put the results of equations (3) and (4) into equation (5) to obtain the prior log-likelihood ratio of m1.

Likewise, information about the prior probabilities that m2 is 0 and 1 as deduced according to the equation $m_3 = m_1 \otimes m_2$ are as shown in equation (6) and equation (7), respectively:

$$Pr_{ch}^{aprior}(m_2 = 0) = Pr_{ch}(m_3 = 0)Pr_{ch}(m_2 = 0 \mid m_3 = 0) + \quad (6)$$
$$Pr_{ch}(m_3 = 1)Pr_{ch}(m_2 = 0 \mid m_3 = 1)$$

$$= \frac{Pr_{ch}(m_3 = 0)Pr_{ch}(m_2 = 0)Pr_{ch}(m_3 = 0 \mid m_2 = 0)}{Pr_{ch}(m_2 = 0)Pr_{ch}(m_3 = 0 \mid m_2 = 0) +} +$$
$$Pr_{ch}(m_2 = 1)Pr_{ch}(m_3 = 0 \mid m_2 = 1)$$

$$\frac{Pr_{ch}(m_3 = 1)Pr_{ch}(m_2 = 0)Pr_{ch}(m_3 = 1 \mid m_2 = 0)}{Pr_{ch}(m_2 = 0)Pr_{ch}(m_3 = 1 \mid m_2 = 0) +}$$
$$Pr_{ch}(m_2 = 1)Pr_{ch}(m_3 = 1 \mid m_2 = 1)$$

$$= \frac{Pr_{ch}(m_1 = 0)Pr_{ch}(m_2 = 0)Pr_{ch}(m_3 = 0)}{Pr_{ch}(m_1 = 0)Pr_{ch}(m_2 = 0) +} +$$
$$Pr_{ch}(m_1 = 1)Pr_{ch}(m_2 = 1)$$

$$\frac{Pr_{ch}(m_1 = 1)Pr_{ch}(m_2 = 0)Pr_{ch}(m_3 = 1)}{Pr_{ch}(m_1 = 1)Pr_{ch}(m_2 = 0) +}$$
$$Pr_{ch}(m_1 = 0)Pr_{ch}(m_2 = 1)$$

$$Pr_{ch}^{aprior}(m_2 = 1) = Pr_{ch}(m_3 = 0)Pr_{ch}(m_2 = 1 \mid m_3 = 0) + \quad (7)$$
$$Pr_{ch}(m_3 = 1)Pr_{ch}(m_2 = 1 \mid m_3 = 1)$$

$$= \frac{Pr_{ch}(m_3 = 0)Pr_{ch}(m_2 = 1)Pr_{ch}(m_3 = 0 \mid m_2 = 1)}{Pr_{ch}(m_2 = 0)Pr_{ch}(m_3 = 0 \mid m_2 = 0) +} +$$
$$Pr_{ch}(m_2 = 1)Pr_{ch}(m_3 = 0 \mid m_2 = 1)$$

$$\frac{Pr_{ch}(m_3 = 1)Pr_{ch}(m_2 = 1)Pr_{ch}(m_3 = 1 \mid m_2 = 1)}{Pr_{ch}(m_2 = 0)Pr_{ch}(m_3 = 1 \mid m_2 = 0) +}$$
$$Pr_{ch}(m_2 = 1)Pr_{ch}(m_3 = 1 \mid m_2 = 1)$$

$$= \frac{Pr_{ch}(m_1 = 1)Pr_{ch}(m_2 = 1)Pr_{ch}(m_3 = 0)}{Pr_{ch}(m_1 = 0)Pr_{ch}(m_2 = 0) +} +$$
$$Pr_{ch}(m_1 = 1)Pr_{ch}(m_2 = 1)$$

$$\frac{Pr_{ch}(m_1 = 0)Pr_{ch}(m_2 = 1)Pr_{ch}(m_3 = 1)}{Pr_{ch}(m_1 = 1)Pr_{ch}(m_2 = 0) +}$$
$$Pr_{ch}(m_1 = 0)Pr_{ch}(m_2 = 1)$$

By combining equations (6) and (7), according to the definition of a log-likelihood ratio, the prior log-likelihood ratio of m2 may be obtained as follows:

$$LLR_{m_2}^{aprior} = \log\left(\frac{Pr_{ch}^{aprior}(m_2 = 0)}{Pr_{ch}^{aprior}(m_2 = 1)}\right) \quad (8)$$

Combine the obtained prior log-likelihood ratios of m1 and m2 with their log-likelihood ratios after demodulation to obtain posterior log-likelihood ratios of m1 and m2.

$$LLR_{m_i}^{app} = LLR_{m_i} + LLR_{m_i}^{aprior} (i = 1, 2) \quad (9)$$

$LLR_{m_i}^{app}$ is called the posterior log-likelihood ratio of m1 and m2, which may be used to decode m1 and m2.

Figure 12:
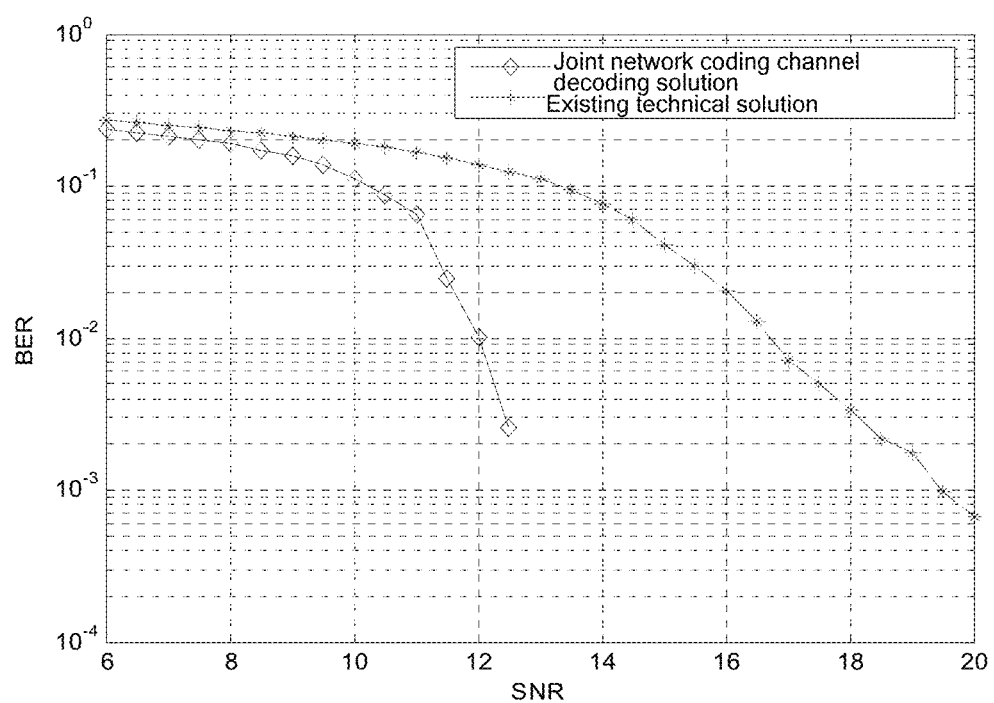
FIG. 12 is a performance simulating diagram of a cooperative communications system according to an embodiment of the present invention.

As shown in FIG. 12, this embodiment simulates the system performance when the receiving method in cooperative communications is used. The simulation test is based on the Matlab simulation platform, where the Turbo code in Long Term Evolution (LTE) is used, the length of an encoding block is 1024 bytes, the maximum number of iteration times in Turbo decoding is 5, and Rayleigh fading channels are used. As shown in FIG. 12, compared with the existing technical solutions, the technical solution (joint network coding channel decoding solution) of using the method in this embodiment yields a gain of almost 4.3 dB when the system bit error rate (BER) is 10-2. The effects are obvious.

According to the technical solutions in the embodiments, for a cooperative communications system where a relay node adopts network coding, based on the exclusive OR feature of network coding, a prior log-likelihood ratio of a source end is obtained, the prior log-likelihood ratio of the source end and a log-likelihood ratio of the source end obtained through demodulation are combined to obtain a posterior log-likelihood ratio of the source end, and then the posterior log-likelihood ratio of the source end is used to decode received source end data. In this manner, the characteristics of network coding are fully utilized, yielding more diversity gains, and greatly improving the system performance.

Figure 5A:
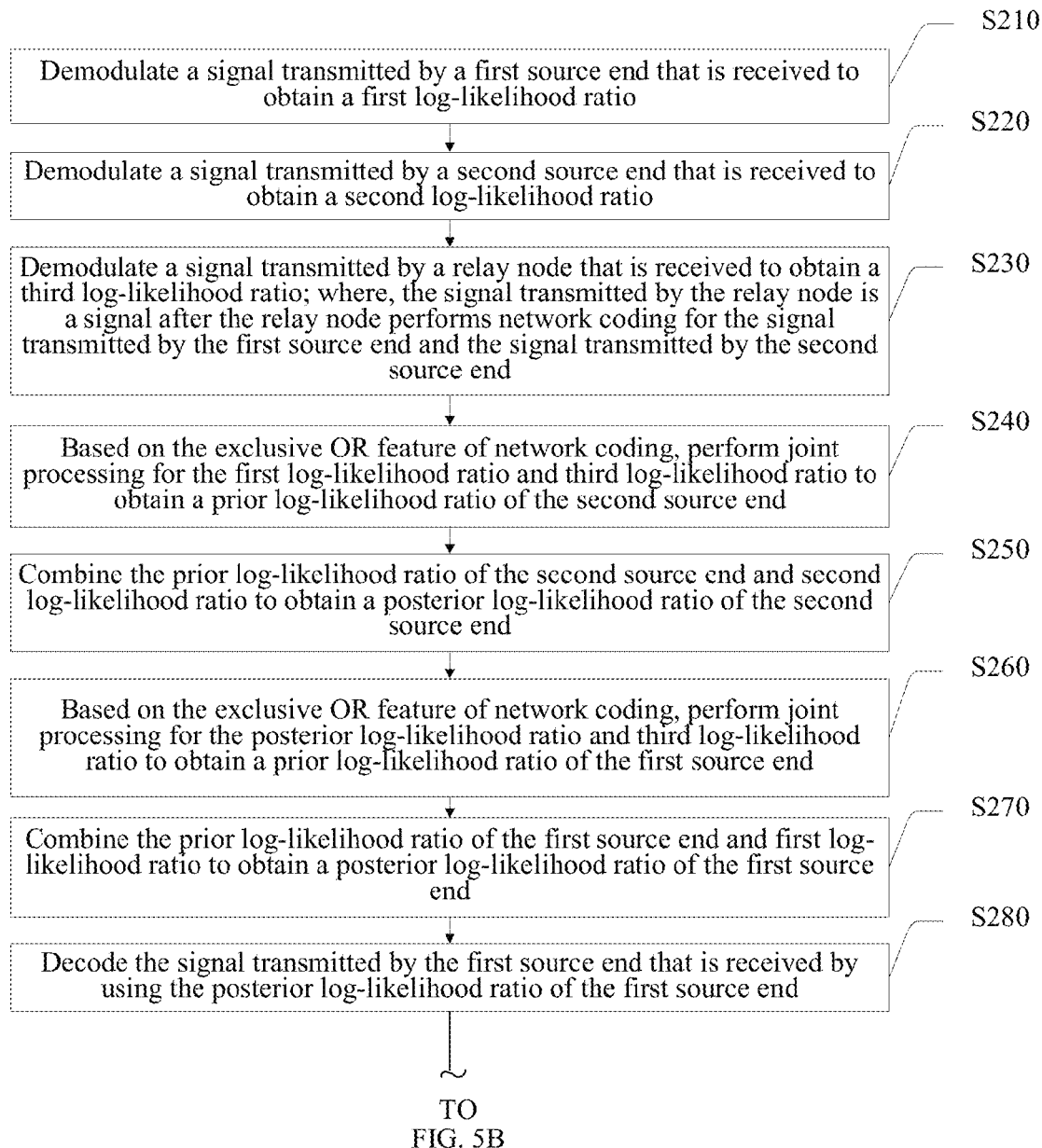
FIG. 5A and FIG. 5B are flow charts of a receiving method in cooperative communications according to an embodiment of the present invention.
Figure 5B:
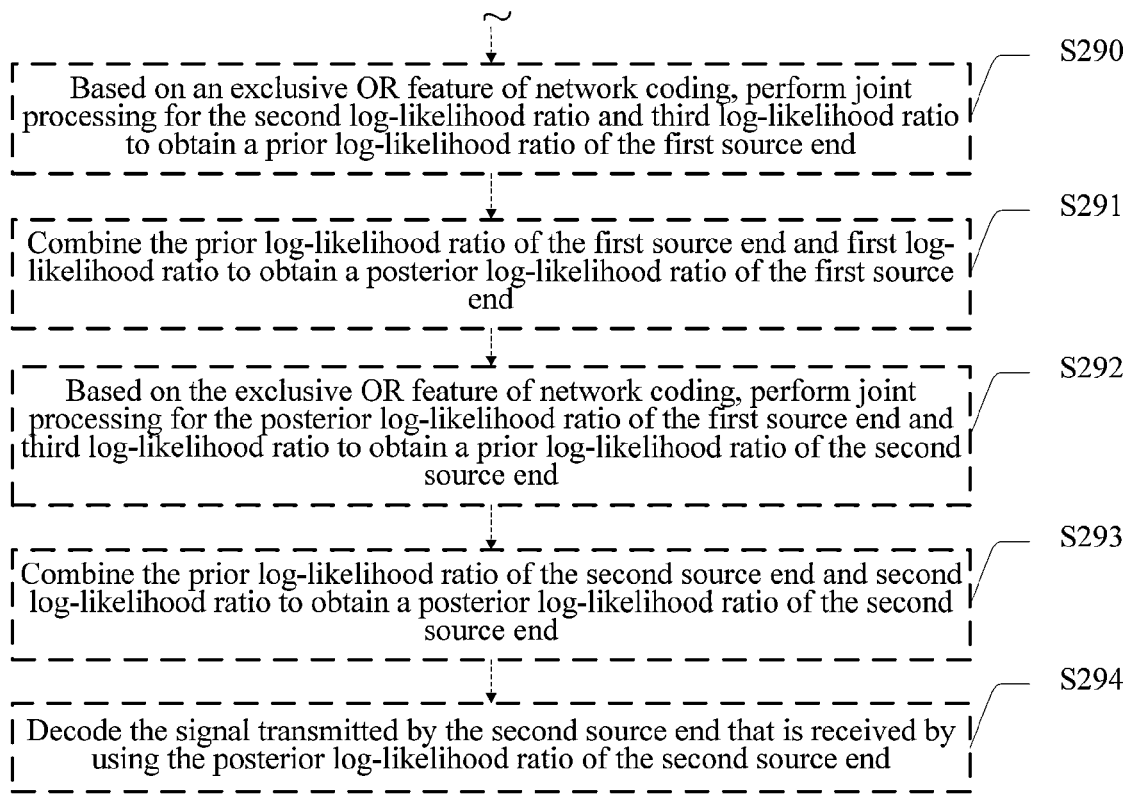

As shown in FIG. 5, an embodiment of the present invention provides a receiving method in cooperative communications. The method includes the following steps:

S210: Demodulate a signal transmitted by a first source end that is received to obtain a first log-likelihood ratio.

S220: Demodulate a signal transmitted by a second source end that is received to obtain a second log-likelihood ratio.

S230: Demodulate a signal transmitted by a relay node that is received to obtain a third log-likelihood ratio; where, the signal transmitted by the relay node is a signal obtained after the relay node performs network coding on the signal transmitted by the first source end and the signal transmitted by the second source end.

S240: Based on an exclusive OR feature of network coding, perform joint processing on the first log-likelihood ratio and the third log-likelihood ratio to obtain a prior log-likelihood ratio of the second source end.

S250: Combine the prior log-likelihood ratio of the second source end and the second log-likelihood ratio to obtain a posterior log-likelihood ratio of the second source end.

S260: Based on the exclusive OR feature of network coding, perform joint processing on the posterior log-likelihood ratio of the second source end and the third log-likelihood ratio to obtain a prior log-likelihood ratio of the first source end.

S270: Combine the prior log-likelihood ratio of the first source end and the first log-likelihood ratio to obtain a posterior log-likelihood ratio of the first source end.

S280: Decode the signal transmitted by the first source end that is received by using the posterior log-likelihood ratio of the first source end.

It should be noted that the process of decoding the signal from the second source end is similar to the process of decoding the signal from the first source end. As shown in the dashed box in FIG. 5, in an embodiment, the method may further include the following:

S290: Based on the exclusive OR feature of network coding, perform joint processing on the second log-likelihood ratio and the third log-likelihood ratio to obtain a prior log-likelihood ratio of the first source end.

S291: Combine the prior log-likelihood ratio of the first source end and the first log-likelihood ratio to obtain a posterior log-likelihood ratio of the first source end.

S292: Based on the exclusive OR feature of network coding, perform joint processing on the posterior log-likelihood ratio of the first source end and the third log-likelihood ratio to obtain a prior log-likelihood ratio of the second source end.

S293: Combine the prior log-likelihood ratio of the second source end and the second log-likelihood ratio to obtain a posterior log-likelihood ratio of the second source end.

S294: Decode the signal transmitted by the second source end that is received by using the posterior log-likelihood ratio of the second source end.

In an embodiment, the technical solution provided in this embodiment may be called the iterative joint network coding channel decoding solution.

Specifically, according to the method in the embodiment, the detailed description is as follows:

In this embodiment, assume that the first log-likelihood ratio is $LLR_{m_1}$, the second log-likelihood ratio is $LLR_{m_2}$, and the third log-likelihood ratio is $LLR_{m_3}$. Make $Pr_{ch}(m_i=0)$ indicate the probability that $m_i$ (i=1, 2, 3) is 0, and $Pr_{ch}(m_i=1)$ indicate the probability that $m_i$ (i=1, 2, 3) is 1. Apparently, $Pr_{ch}(m_i=1)=1-Pr_{ch}(m_i=0)$.

$m_1$ and $m_2$ indicate the messages broadcast by the first source end and second source end, respectively, to the relay node R and base station BS in the first phase, that is, indicate the signal transmitted by the first source and the signal transmitted by the second source end. $m_3$ indicates the message forwarded by the relay node R by using a network coding way (that is, $m_3 = m_1 \otimes m_2$) to the base station after the relay node demodulates and decodes the received signals sent by the first source end and second source end. That is, it is the signal transmitted by the relay node. The specific description is as follows:

Demodulate the received data to obtain each log-likelihood ratio $LLR_{m_i}$. In this case, according to the definition of a log-likelihood ratio, the following is obtained:

$$LLR_{m_i} = \log\left(\frac{Pr_{ch}(m_i = 0)}{Pr_{ch}(m_i = 1)}\right) \qquad (10)$$

$$= \log\left(\frac{Pr_{ch}(m_i = 0)}{1 - Pr_{ch}(m_i = 0)}\right)(i = 1, 2, 3)$$

Perform logarithm to e at both ends of equation (10) to obtain the following:

$$Pr_{ch}(m_i = 0) = \frac{e^{LLR_{m_i}}}{1 + e^{LRR_{m_i}}} (i = 1, 2, 3) \qquad (11)$$

It is easily understood that $Pr_{ch}(m_i=1)=1-Pr_{ch}(m_i=0)$.

As $m_3$ is the message after networking coding for $m_1$ and $m_2$ according to the exclusive OR feature between $m_1$, $m_2$, and $m_3$, the following may be obtained:

$$\begin{aligned}Pr_{ch}^{aprior}(m_1 = 0) &= Pr_{ch}(m_3 = 0)Pr_{ch}(m_1 = 0 \mid m_3 = 0) + \\ &\quad Pr_{ch}(m_3 = 1)Pr_{ch}(m_1 = 0 \mid m_3 = 1) \\ &= \frac{Pr_{ch}(m_3 = 0)Pr_{ch}(m_1 = 0)Pr_{ch}(m_3 = 0 \mid m_1 = 0)}{Pr_{ch}(m_1 = 0)Pr_{ch}(m_3 = 0 \mid m_1 = 0) +} + \\ &\quad Pr_{ch}(m_1 = 1)Pr_{ch}(m_3 = 0 \mid m_1 = 1)\end{aligned} \qquad (12)$$

-continued $$\frac{Pr_{ch}(m_3=1)Pr_{ch}(m_1=0)Pr_{ch}(m_3=1\mid m_1=0)}{\begin{array}{c}Pr_{ch}(m_1=0)Pr_{ch}(m_3=1\mid m_1=0)+\\Pr_{ch}(m_1=1)Pr_{ch}(m_3=1\mid m_1=1)\end{array}}$$

$$=\frac{Pr_{ch}(m_1=0)Pr_{ch}(m_2=0)Pr_{ch}(m_3=0)}{\begin{array}{c}Pr_{ch}(m_1=0)Pr_{ch}(m_2=0)+\\Pr_{ch}(m_1=1)Pr_{ch}(m_2=1)\end{array}}+$$

$$\frac{Pr_{ch}(m_1=0)Pr_{ch}(m_2=1)Pr_{ch}(m_3=1)}{\begin{array}{c}Pr_{ch}(m_1=0)Pr_{ch}(m_2=1)+\\Pr_{ch}(m_1=1)Pr_{ch}(m_2=0)\end{array}}$$

$Pr_{ch}^{aprior}(m_1=0)$ indicates information about the prior probability that m1 is 0, which is deduced according to the equation $m_3=m_1\otimes m_2$. Likewise, information about the prior probability that m1 is 1 as deduced according to the equation $m_3=m_1\otimes m_2$ is as follows:

$$Pr_{ch}^{aprior}(m_1=1) = Pr_{ch}(m_3=0)Pr_{ch}(m_1=1\mid m_3=0) + \quad (13)$$

$$Pr_{ch}(m_3=1)Pr_{ch}(m_1=1\mid m_3=1)$$

$$=\frac{Pr_{ch}(m_3=0)Pr_{ch}(m_1=1)Pr_{ch}(m_3=0\mid m_1=1)}{\begin{array}{c}Pr_{ch}(m_1=1)Pr_{ch}(m_3=0\mid m_1=1)+\\Pr_{ch}(m_1=0)Pr_{ch}(m_3=0\mid m_1=0)\end{array}}+$$

$$\frac{Pr_{ch}(m_3=1)Pr_{ch}(m_1=1)Pr_{ch}(m_3=1\mid m_1=1)}{\begin{array}{c}Pr_{ch}(m_1=0)Pr_{ch}(m_3=1\mid m_1=0)+\\Pr_{ch}(m_1=1)Pr_{ch}(m_3=1\mid m_1=1)\end{array}}$$

$$=\frac{Pr_{ch}(m_1=1)Pr_{ch}(m_2=1)Pr_{ch}(m_3=0)}{\begin{array}{c}Pr_{ch}(m_1=0)Pr_{ch}(m_2=0)+\\Pr_{ch}(m_1=1)Pr_{ch}(m_2=1)\end{array}}+$$

$$\frac{Pr_{ch}(m_1=1)Pr_{ch}(m_2=0)Pr_{ch}(m_3=1)}{\begin{array}{c}Pr_{ch}(m_1=0)Pr_{ch}(m_2=1)+\\Pr_{ch}(m_1=1)Pr_{ch}(m_2=0)\end{array}}$$

By combining equations (12) and (13), according to the definition of a log-likelihood ratio, the prior log-likelihood ratio of m1 may be obtained as follows:

$$LLR_{m_1}^{aprior} = \log\left(\frac{Pr_{ch}^{aprior}(m_1=0)}{Pr_{ch}^{aprior}(m_1=1)}\right) \quad (14)$$

Combine the obtained prior log-likelihood ratio of m1 with its log-likelihood ratio after demodulation to obtain a posterior log-likelihood ratio of m1.

$$LLR_{m_1}^{app}=LLR_{m_1}+LLR_{m_1}^{aprior}(i=1,2) \quad (15)$$

Calculate $LLR_{m_1}$ by using the posterior log-likelihood ratio of m1 obtained in equation (15). Then obtain new $Pr_{ch}(m_1=0)$ and $Pr_{ch}(m_1=1)$ according to equation (11). The information about prior probabilities that m2 is 0 and 1 as deduced according to $m_3=m_1\otimes m_2$ is shown in equation (16) and equation (17), respectively:

$$Pr_{ch}^{aprior}(m_2=0) = Pr_{ch}(m_3=0)Pr_{ch}(m_2=0\mid m_3=0) + \quad (16)$$

$$Pr_{ch}(m_3=1)Pr_{ch}(m_2=0\mid m_3=1)$$

$$=\frac{Pr_{ch}(m_3=0)Pr_{ch}(m_2=0)Pr_{ch}(m_3=0\mid m_2=0)}{\begin{array}{c}Pr_{ch}(m_2=0)Pr_{ch}(m_3=0\mid m_2=0)+\\Pr_{ch}(m_2=1)Pr_{ch}(m_3=0\mid m_2=1)\end{array}}+$$

$$\frac{Pr_{ch}(m_3=1)Pr_{ch}(m_2=0)Pr_{ch}(m_3=1\mid m_2=0)}{\begin{array}{c}Pr_{ch}(m_2=0)Pr_{ch}(m_3=1\mid m_2=0)+\\Pr_{ch}(m_2=1)Pr_{ch}(m_3=1\mid m_2=1)\end{array}}$$

$$=\frac{Pr_{ch}(m_1=0)Pr_{ch}(m_2=0)Pr_{ch}(m_3=0)}{\begin{array}{c}Pr_{ch}(m_1=0)Pr_{ch}(m_2=0)+\\Pr_{ch}(m_1=1)Pr_{ch}(m_2=1)\end{array}}+$$

$$\frac{Pr_{ch}(m_1=1)Pr_{ch}(m_2=0)Pr_{ch}(m_3=1)}{\begin{array}{c}Pr_{ch}(m_1=1)Pr_{ch}(m_2=0)+\\Pr_{ch}(m_1=0)Pr_{ch}(m_2=1)\end{array}}$$

$$Pr_{ch}^{aprior}(m_2=1) = Pr_{ch}(m_3=0)Pr_{ch}(m_2=1\mid m_3=0) + \quad (17)$$

$$Pr_{ch}(m_3=1)Pr_{ch}(m_2=1\mid m_3=1)$$

$$=\frac{Pr_{ch}(m_3=0)Pr_{ch}(m_2=1)Pr_{ch}(m_3=0\mid m_2=1)}{\begin{array}{c}Pr_{ch}(m_2=0)Pr_{ch}(m_3=0\mid m_2=0)+\\Pr_{ch}(m_2=1)Pr_{ch}(m_3=0\mid m_2=1)\end{array}}+$$

$$\frac{Pr_{ch}(m_3=1)Pr_{ch}(m_2=1)Pr_{ch}(m_3=1\mid m_2=1)}{\begin{array}{c}Pr_{ch}(m_2=0)Pr_{ch}(m_3=1\mid m_2=0)+\\Pr_{ch}(m_2=1)Pr_{ch}(m_3=1\mid m_2=1)\end{array}}$$

$$=\frac{Pr_{ch}(m_1=1)Pr_{ch}(m_2=1)Pr_{ch}(m_3=0)}{\begin{array}{c}Pr_{ch}(m_1=0)Pr_{ch}(m_2=0)+\\Pr_{ch}(m_1=1)Pr_{ch}(m_2=1)\end{array}}+$$

$$\frac{Pr_{ch}(m_1=0)Pr_{ch}(m_2=1)Pr_{ch}(m_3=1)}{\begin{array}{c}Pr_{ch}(m_1=1)Pr_{ch}(m_2=0)+\\Pr_{ch}(m_1=0)Pr_{ch}(m_2=1)\end{array}}$$

By combining equations (16) and (17), according to the definition of log-likelihood ratio, the prior log-likelihood ratio of m2 may be obtained as follows:

$$LLR_{m_2}^{aprior} = \log\left(\frac{Pr_{ch}^{aprior}(m_2=0)}{Pr_{ch}^{aprior}(m_2=1)}\right) \quad (18)$$

Put $Pr_{ch}(m_1=0)$, $Pr_{ch}(m_1=1)$, $Pr_{ch}(m_2=0)$, $Pr_{ch}(m_2=1)$, and $Pr_{ch}(m_3=1)$ obtained according to equation (11) into equations (16) and (17), and then put the calculation results of equations (16) and (17) into equation (18) to obtain the prior log-likelihood ratio of m2.

Combine the obtained prior log-likelihood ratio of m2 with its log-likelihood ratio after demodulation to obtain a posterior log-likelihood ratio of m2.

$$LLR_{m_2}^{app}=LLR_{m_2}+LLR_{m_2}^{aprior}(i=1,2) \quad (19)$$

It is easily understood that the posterior log-likelihood ratio of m1 may also be obtained according to a process similar to the preceding one, and the process is not described herein.

Enter the obtained posterior log-likelihood ratios of m1 and m2 to a decoder for decoding.

Figure 13:
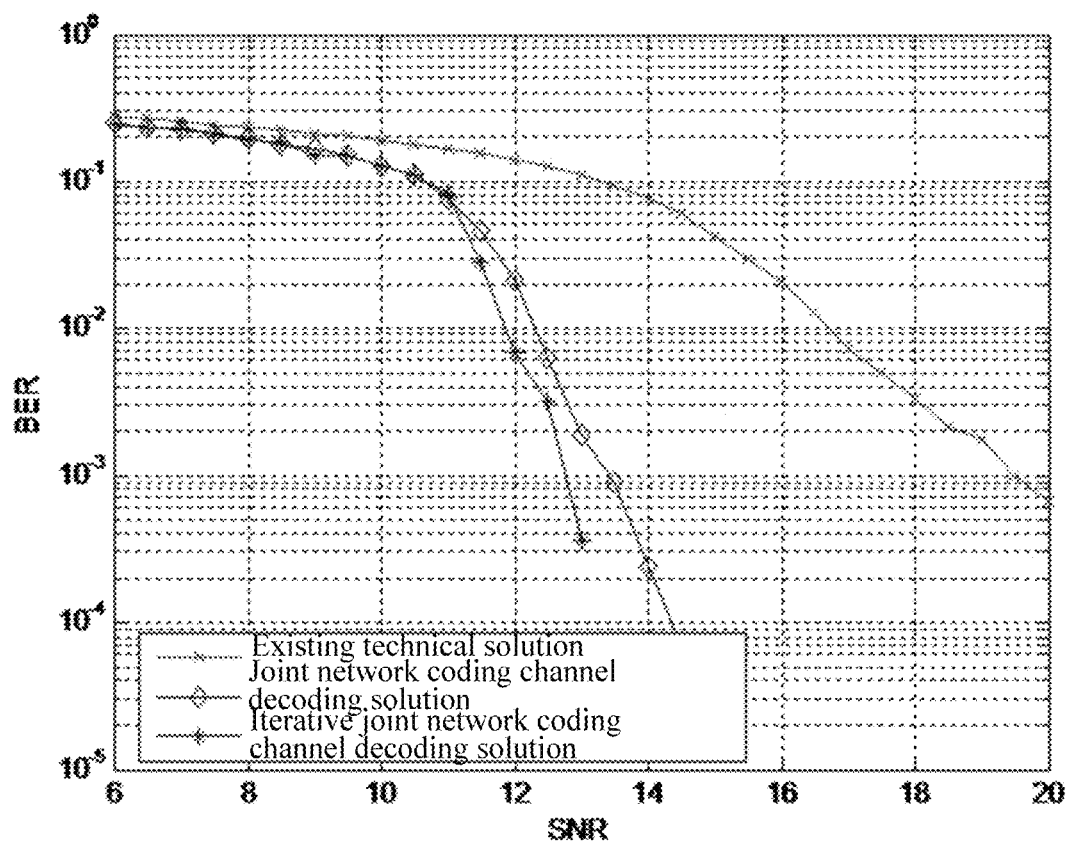
FIG. 13 is a performance simulating diagram of a cooperative communications system according to an embodiment of the present invention.

As shown in FIG. 13, this embodiment simulates the system performance when the receiving method in cooperative communications is used. The simulation test is based on the Matlab simulation platform, where Turbo code in LTE is used, the length of an encoding block is 1024 bytes, the maximum number of iteration times in Turbo decoding is 5, and Rayleigh fading channels are used. As shown in FIG. 13, compared with the existing technical solutions, the technical solution (iterative joint network coding channel decoding solution) of using the method in this embodiment yields a gain of almost 4.5 dB when the system BER is 10-2. The effects are obvious. In addition, compared with the joint network coding channel decoding solution (non-iterative), the iterative joint network coding channel decoding solution according to this embodiment achieves a lower system BER (the BER simulation curve in the iterative solution is below the BER simulation curve in the non-iterative solution), further improving the system performance.

According to the technical solutions in the embodiments, for a cooperative communications system where a relay node adopts network coding, based on the exclusive OR feature of network coding, a prior log-likelihood ratio of a source end is obtained, the prior log-likelihood ratio of the source end and a log-likelihood ratio of the source end obtained through demodulation are combined to obtain a posterior log-likelihood ratio of the source end, a posterior log-likelihood ratio of another source end is obtained through iterative calculation of the posterior log-likelihood ratio of the source end, and then the posterior log-likelihood ratio of the another source end is used to decode received data of the another source end. In this manner, the characteristics of network coding are fully utilized, yielding more diversity gains, and greatly improving the system performance.

Figure 6:
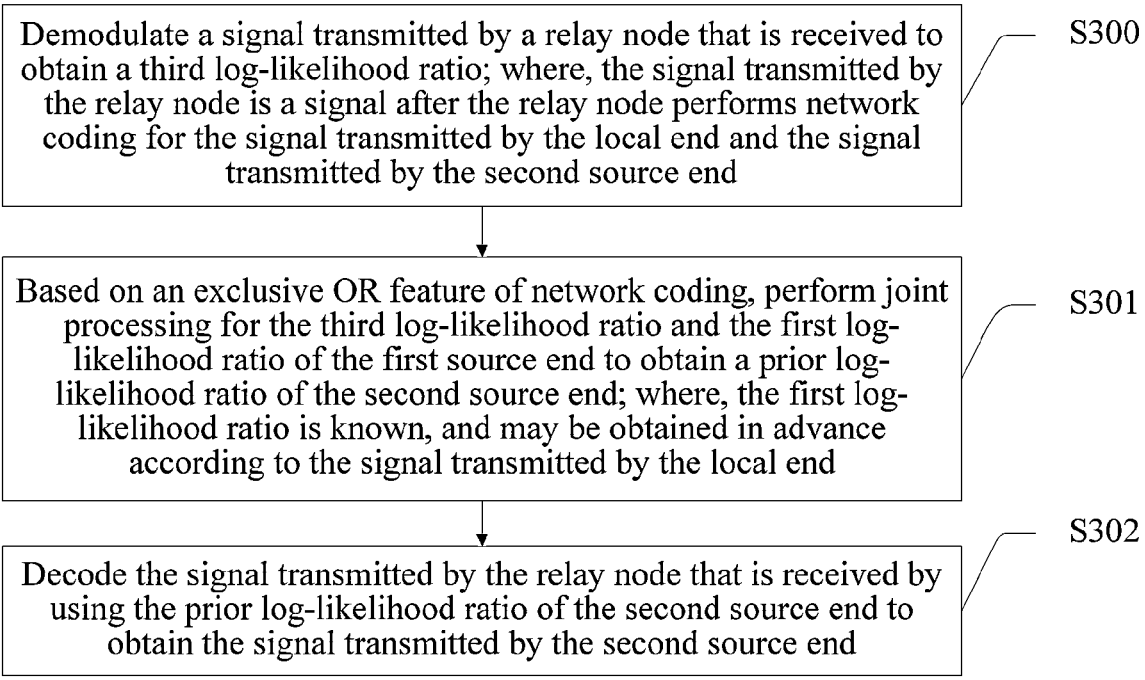
FIG. 6 is a flow chart of a receiving method in cooperative communications according to an embodiment of the present invention.

As shown in FIG. 6, an embodiment of the present invention provides a receiving method in cooperative communications. The method includes the following steps:

S300: Demodulate a signal transmitted by a relay node that is received to obtain a third log-likelihood ratio; where, the signal transmitted by the relay node is a signal obtained after the relay node performs network coding on a signal transmitted by a local end and a signal transmitted by a peer end.

It should be noted that the local end in this embodiment refers to an apparatus for executing the method in this embodiment, and may be a terminal or a base station. The peer end is relative to the local end (the apparatus for executing the method in this embodiment).

S301: Based on an exclusive OR feature of network coding, perform joint processing on the third log-likelihood ratio and a first log-likelihood ratio of the local end to obtain a prior log-likelihood ratio of the peer end; where, the first log-likelihood ratio is known, and may be obtained in advance according to the signal transmitted by the local end.

S302: Decode the signal transmitted by the relay node that is received by using the prior log-likelihood ratio of the peer end to obtain a signal transmitted by the peer end.

Figure 14:
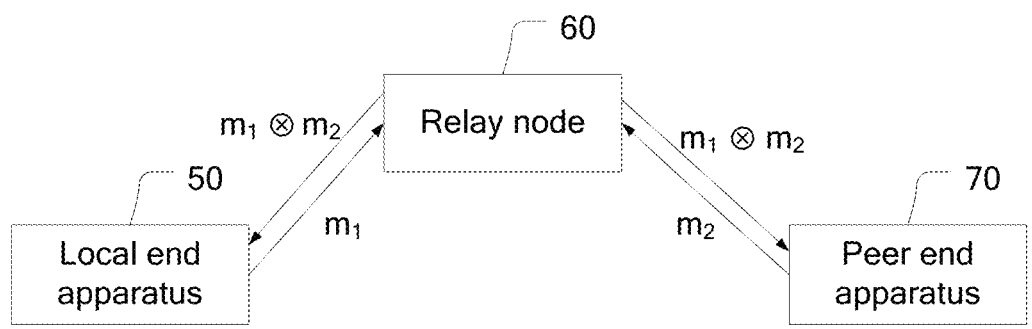
FIG. 14 is a schematic structural diagram of a cooperative communications system according to an embodiment of the present invention.

In an embodiment, the receiving method in cooperative communications corresponding to FIG. 6 may be used in the cooperative communications system shown in FIG. 14. Specifically, according to the method in the embodiment, based on the application system scenario in FIG. 14, the detailed description is as follows:

In this embodiment, assume that the first log-likelihood ratio is $LLR_{m_1}$, and the third log-likelihood ratio is $LLR_{m_3}$. Make $Pr_{ch}(m_i=0)$ indicate the probability that $m_i(i=1, 2, 3)$ is 0, and $Pr_{ch}(m_i=1)$ indicate the probability that $m_i(i=1, 2, 3)$ is 1. Apparently, $Pr_{ch}(m_i=1)=1-Pr_{ch}(m_i=0)$.

$m_1$ indicates the message transmitted by the local end (a local end apparatus 50) in the first phase to the relay node R (a relay node 60), that is, the signal transmitted by the local end; $m_2$ indicates the message transmitted by the peer end (a peer end apparatus 70) in the second phase to the relay node R (a relay node 60), that is, the signal transmitted by the peer end; $m_3$ indicates the message forwarded by the relay node R by using a network coding way (that is, $m_{3=m_1} \otimes m_2$) to the local end and peer end after the relay node demodulates and decodes the received signals sent by the local end and peer end, that is, the signal transmitted by the relay node.

Corresponding to the preceding embodiment, the processing method is described as follows:

After receiving the signal that is forwarded by the relay node and has undergone the network coding, the local end demodulates the signal, and records the log-likelihood ratio after demodulation as $LLR_{m_3}$ (the third log-likelihood ratio).

According to network decoding, because $m_2=m_1 \otimes m_3$, there are two cases in which $m_2$ is 0, that is, when $m_1$ and $m_3$ are both 0, and when $m_1$ and $m_3$ are both 1. There are two cases in which $m_2$ is 1, that is, when $m_1=0$ and $m_3=1$, and when $m_1=1$ and $m_3=0$. Therefore, the prior likelihood ratio (second likelihood ratio) of $m_2$ (that is, the signal transmitted by the peer end) is as follows:

$$LLR_{m_2}^{aprior} = \log\left(\frac{Pr_{ch}^{aprior}(m_2 = 0)}{Pr_{ch}^{aprior}(m_2 = 1)}\right) \quad (11)$$

$$= \log\left(\frac{Pr_{ch}(m_1 = 0)Pr_{ch}(m_3 = 0) + Pr_{ch}(m_1 = 1)Pr_{ch}(m_3 = 1)}{Pr_{ch}(m_1 = 0)Pr_{ch}(m_3 = 1) + Pr_{ch}(m_1 = 1)Pr_{ch}(m_3 = 0)}\right)$$

$$= \log\left(\frac{Pr_{ch}(m_1 = 0)Pr_{ch}(m_3 = 0) + (1 - Pr_{ch}(m_1 = 0))(1 - Pr_{ch}(m_3 = 0))}{Pr_{ch}(m_1 = 0)(1 - Pr_{ch}(m_3 = 0)) + (1 - Pr_{ch}(m_1 = 0))Pr_{ch}(m_3 = 0)}\right)$$

$$= \log\left(\frac{\left(\frac{e^{LLR_{m_1}}}{1+e^{LLR_{m_1}}}\right)\left(\frac{e^{LLR_{m_3}}}{1+e^{LLR_{m_3}}}\right) + \left(1-\frac{e^{LLR_{m_1}}}{1+e^{LLR_{m_1}}}\right)\left(1-\frac{e^{LLR_{m_3}}}{1+e^{LLR_{m_3}}}\right)}{\left(\frac{e^{LLR_{m_1}}}{1+e^{LLR_{m_1}}}\right)\left(1-\frac{e^{LLR_{m_3}}}{1+e^{LLR_{m_3}}}\right) + \left(1-\frac{e^{LLR_{m_1}}}{1+e^{LLR_{m_1}}}\right)\left(\frac{e^{LLR_{m_3}}}{1+e^{LLR_{m_3}}}\right)}\right)$$

$$= \log\left(\frac{1 + e^{LLR_{m_1} + LLR_{m_3}}}{e^{LLR_{m_1}} + e^{LLR_{m_3}}}\right)$$

In this embodiment, because $m_1$ is known to the local end, the first log-likelihood ratio $LLR_{m_1}$ may be expressed as follows:

$$LLR_{m_1} = \begin{cases} \beta, & \text{if } m_1 = 1 \\ -\beta, & \text{if } m_1 = 0 \end{cases} \quad (12)$$

Here, β may be a positive real number. In an embodiment, the value of β may be 10. Certainly, in another embodiment, it may be 8. In still another embodiment, it may further be 6. The embodiments of the present invention do not restrict the value of β.

Put equation (12) and the third log-likelihood ratio obtained by performing demodulation into equation (11) to obtain the prior log-likelihood ratio (the second prior log-likelihood ratio) of the peer end.

Decode the signal transmitted by the relay node that is received by using the obtained prior log-likelihood ratio (second prior log-likelihood ratio) of the second source end. Then the $m_2$ message transmitted by the peer end may be obtained.

According to the technical solution in the embodiment, for a cooperative communications system where a relay node adopts network coding, a posterior log-likelihood ratio of a peer end is obtained based on the exclusive OR feature of network coding, and the posterior log-likelihood ratio of the peer end is used to decode received data. In this manner, the characteristics of network coding are fully utilized, yielding more diversity gains, and greatly improving the system performance.

Figure 7:
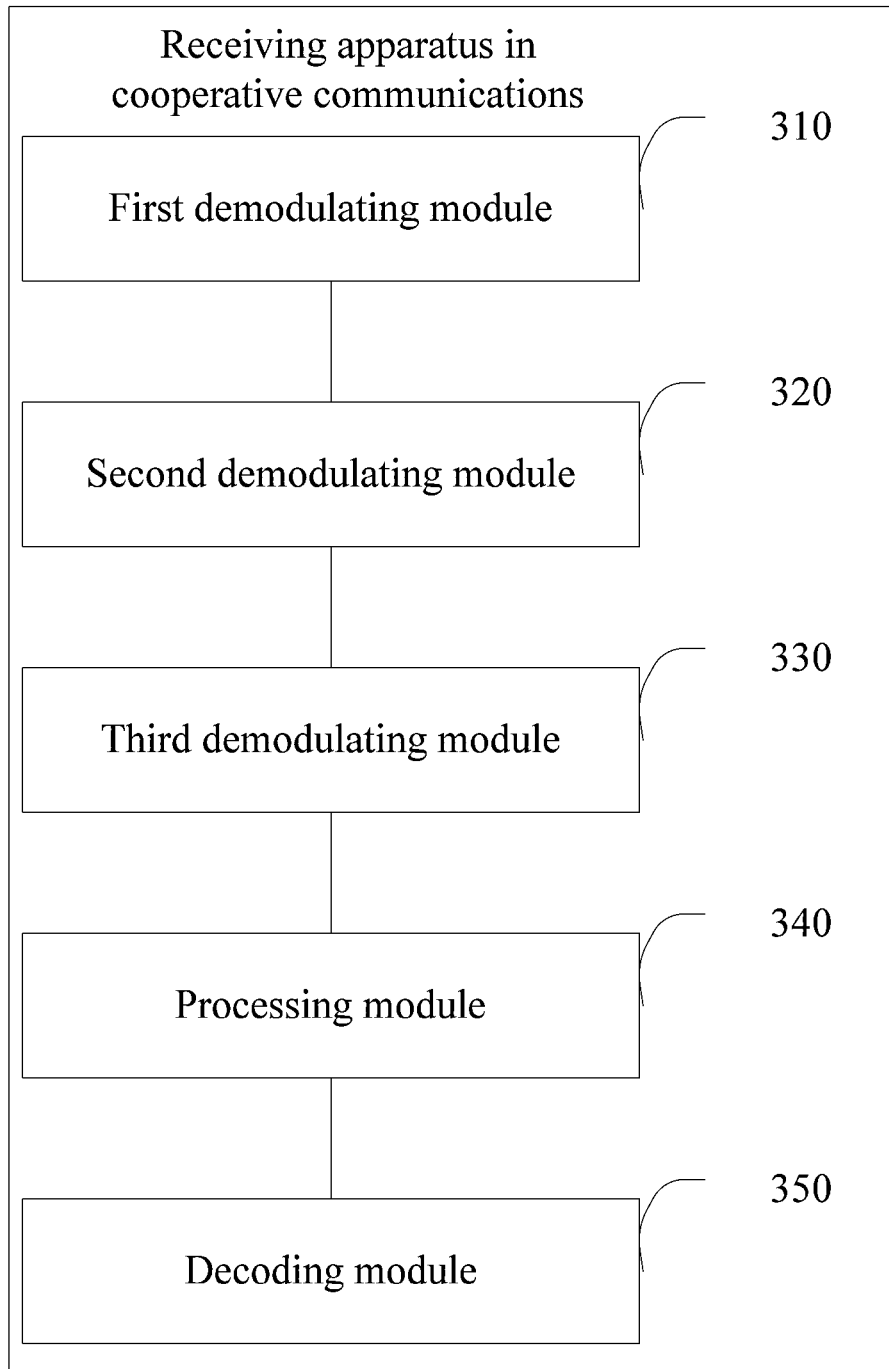
FIG. 7 is a schematic structural diagram of a receiving apparatus in cooperative communications according to an embodiment of the present invention.

As shown in FIG. 7, an embodiment of the present invention provides a receiving apparatus in cooperative communications. The apparatus includes: a first demodulating module 310 configured to demodulate a signal transmitted by a first source end that is received to obtain a first log-likelihood ratio; a second demodulating module 320 configured to demodulate a signal transmitted by a second source end that is received to obtain a second log-likelihood ratio; a third demodulating module 330 configured to demodulate a signal transmitted by a relay node that is received to obtain a third log-likelihood ratio; where, the signal transmitted by the relay node is a signal obtained after the relay node performs network coding on the signal transmitted by the first source end and the signal transmitted by the second source end; a processing module 340 configured to: based on an exclusive OR feature of network coding, process the first log-likelihood ratio, the second log-likelihood ratio, and the third log-likelihood ratio to obtain a posterior log-likelihood ratio of the first source end; and a decoding module 350 configured to decode the signal transmitted by the first source end that is received by using the posterior log-likelihood ratio of the first source end obtained by the processing module 340.

It should be noted that the processing module 340 may further be configured to: based on the exclusive OR feature of network coding, process the first log-likelihood ratio, the second log-likelihood ratio, and the third log-likelihood ratio to obtain a posterior log-likelihood ratio of the second source end; and the decoding module 350 may further be configured to decode the signal transmitted by the second source end that is received by using the posterior log-likelihood ratio of the second source end obtained by the processing module 340.

According to the technical solution in the embodiment, for a cooperative communications system where a relay node adopts network coding, based on the exclusive OR feature of network coding, a posterior log-likelihood ratio of a source end is obtained, and the posterior log-likelihood ratio of the source end is used to decode received source end data. In this manner, the characteristics of network coding are fully utilized, yielding more diversity gains, and greatly improving the system performance.

Figure 8:
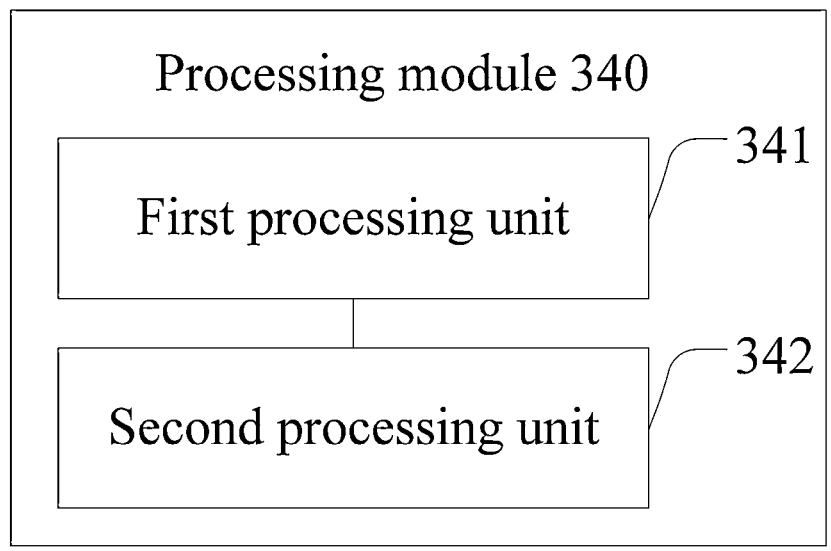
FIG. 8 is a schematic structural diagram of a processing module in a receiving apparatus in cooperative communications according to an embodiment of the present invention.

As shown in FIG. 8, in an embodiment, the processing module 340 may include: a first processing unit 341 configured to: based on the exclusive OR feature of network coding, perform joint processing on the second log-likelihood ratio and third log-likelihood ratio to obtain a prior log-likelihood ratio of the first source end;

The specific processing and calculation procedures of the first processing unit 341 are described in the method embodiment, and are not described herein.

A second processing unit 342 is configured to combine the prior log-likelihood ratio of the first source end and first log-likelihood ratio to obtain a posterior log-likelihood ratio of the first source end.

The specific processing and calculation procedures of the second processing unit 342 are described in the method embodiment, and are not described herein.

According to the technical solutions in the embodiments, for a cooperative communications system where a relay node adopts network coding, based on the exclusive OR feature of network coding, a prior log-likelihood ratio of a source end is obtained, the prior log-likelihood ratio of the source end and a log-likelihood ratio of the source end obtained through demodulation are combined to obtain a posterior log-likelihood ratio of the source end, and then the posterior log-likelihood ratio of the source end is used to decode received source end data. In this manner, the characteristics of network coding are fully utilized, yielding more diversity gains, and greatly improving the system performance.

Figure 9:
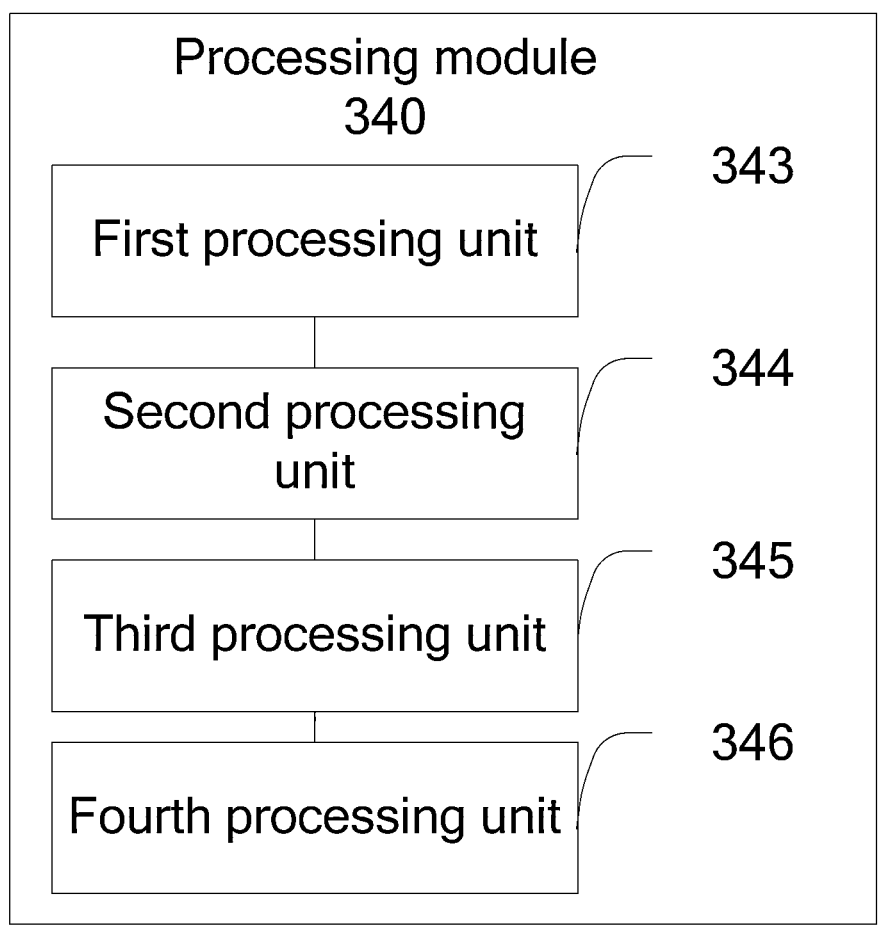
FIG. 9 is a schematic structural diagram of a processing module in a receiving apparatus in cooperative communications according to an embodiment of the present invention.

As shown in FIG. 9, in an embodiment, the processing module 340 may further include: a third processing unit 343 configured to: based on the exclusive OR feature of network coding, perform joint processing on the first log-likelihood ratio and third log-likelihood ratio to obtain a prior log-likelihood ratio of the second source end. The specific processing and calculation procedures of the third processing unit 343 are described in the method embodiment, and are not described herein.

A fourth processing unit 344 is configured to combine the prior log-likelihood ratio of the second source end and second log-likelihood ratio to obtain a posterior log-likelihood ratio of the second source end.

The specific processing and calculation procedures of the fourth processing unit 344 are described in the method embodiment, and are not described herein.

A fifth processing unit 345 is configured to: based on the exclusive OR feature of network coding, perform joint processing on the posterior log-likelihood ratio of the second source end and third log-likelihood ratio to obtain a prior log-likelihood ratio of the first source end.

The specific processing and calculation procedures of the fifth processing unit 345 are described in the method embodiment, and are not described herein.

A sixth processing unit 346 is configured to combine the prior log-likelihood ratio of the first source end and first log-likelihood ratio to obtain a posterior log-likelihood ratio of the first source end.

The specific processing and calculation procedures of the sixth processing unit 346 are described in the method embodiment, and are not described herein.

It should be noted that the processing apparatus in cooperative communications may be a base station in an embodiment, or a terminal in another embodiment.

According to the technical solutions in the embodiments, for a cooperative communications system where a relay node adopts network coding, based on the exclusive OR feature of network coding, a prior log-likelihood ratio of a source end is obtained, the prior log-likelihood ratio of the source end and a log-likelihood ratio of the source end obtained through demodulation are combined to obtain a posterior log-likelihood ratio of the source end, a posterior log-likelihood ratio of another source end is obtained through iterative calculation of the posterior log-likelihood ratio of the source end, and then the posterior log-likelihood ratio of the another source end is used to decode received data of the another source end. In this manner, the characteristics of network coding are fully utilized, yielding more diversity gains, and greatly improving the system performance.

Figure 10:
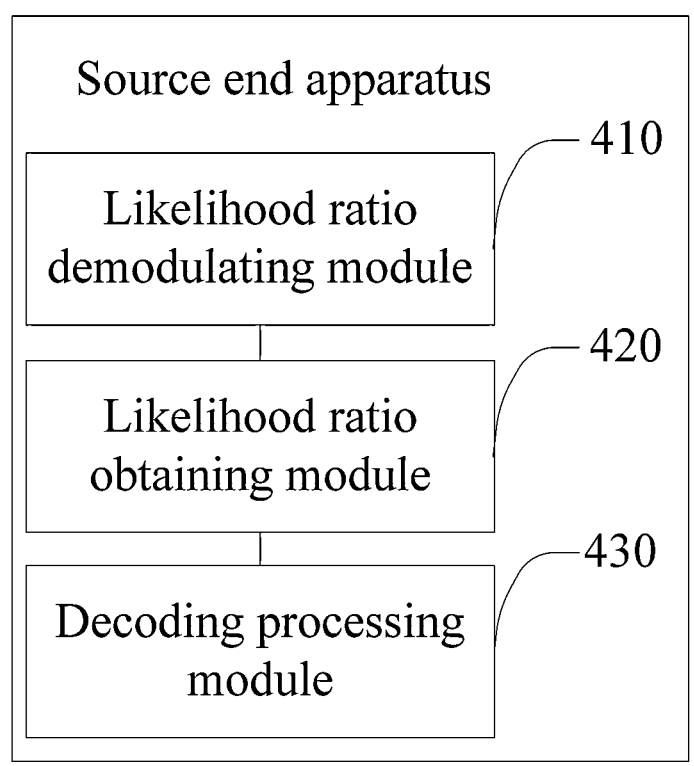
FIG. 10 is a schematic structural diagram of a source end apparatus according to an embodiment of the present invention.

As shown in FIG. 10, an embodiment of the present invention provides a source end apparatus, including: a likelihood ratio demodulating module 410 configured to demodulate a signal transmitted by a relay node that is received to obtain a third log-likelihood ratio; where, the signal transmitted by the relay node is a signal obtained after the relay node performs network coding on a signal transmitted by the source end apparatus and a signal transmitted by a peer end of the source end apparatus; a likelihood ratio obtaining module 420 configured to: based on an exclusive OR feature of network coding, perform joint processing on the third log-likelihood ratio and the first log-likelihood ratio of the source end apparatus to obtain a second prior log-likelihood ratio of the peer end of the source end apparatus; where, the first log-likelihood ratio is known, and may be obtained in advance according to a signal transmitted by the source end apparatus;

The specific processing method of the likelihood ratio obtaining module 420 is described in detail in the method embodiment, and is not described herein.

In this embodiment, because the signal sent by the source end apparatus is known to the source end apparatus, the first log-likelihood ratio $LLR_{m_1}$ may be expressed as follows:

$$LLR_{m1} = \begin{cases} \beta, & \text{if } m_1 = 1 \\ -\beta, & \text{if } m_1 = 0 \end{cases},$$

where $\beta$ may be a positive real number. In an embodiment, the value of $\beta$ may be 10. Certainly, in another embodiment, it may be 8. In still another embodiment, it may further be 6. The embodiments of the present invention do not restrict the value of $\beta$.

A decoding processing module 430 is configured to decode the signal transmitted by the peer end of the source end apparatus that is received by using the second prior log-likelihood ratio obtained by the likelihood ratio obtaining module 420.

It should be noted that the source end apparatus may be a base station in an embodiment, or a terminal in another embodiment.

In an embodiment, the source end apparatus corresponding to FIG. 10 may be used in the cooperative communications system shown in FIG. 14. In this case, the source end apparatus is a local end apparatus 50. It is easily understood that as the local end apparatus 50 and a peer end apparatus 70 are symmetrical concepts. The peer end apparatus 70 has the structure and functions similar to those of the source end apparatus.

According to the technical solution in the embodiment, for a cooperative communications system where a relay node adopts network coding, based on the exclusive OR feature of network coding, a posterior log-likelihood ratio of a peer end of a source end apparatus is obtained, and the posterior log-likelihood ratio of the peer end of the source end apparatus is used to decode received data. In this manner, the characteristics of network coding are fully utilized, yielding more diversity gains, and greatly improving the system performance.

Figure 11:
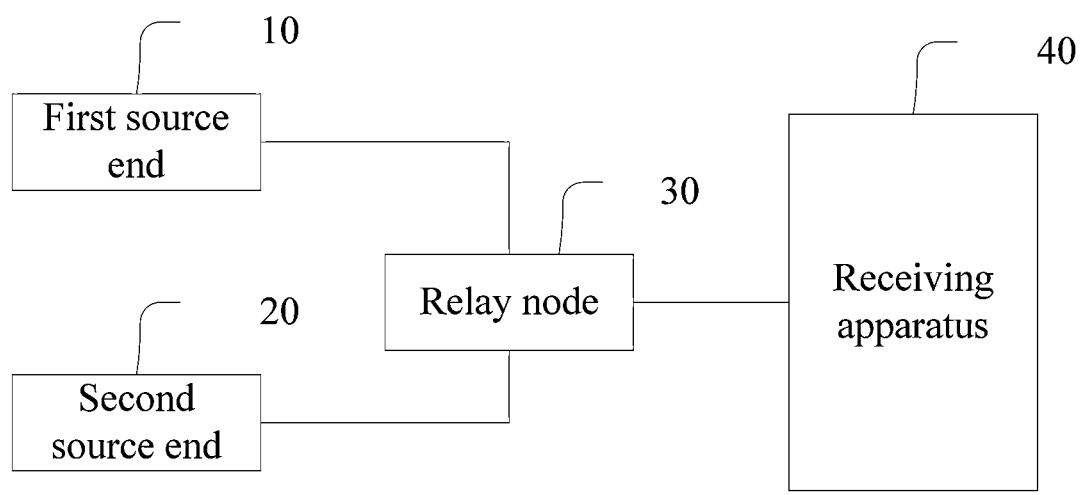
FIG. 11 is a schematic structural diagram of a cooperative communications system according to an embodiment of the present invention.

FIG. 11 is a schematic structural diagram of a cooperative communications system according to an embodiment. The system includes a first source end 10, a second source end 20, a relay node 30, and a receiving apparatus 40.

The first source end 10 is configured to transmit a signal to the relay node 30 and the receiving apparatus 40.

The second source end 20 is configured to transmit a signal to the relay node 30 and the receiving apparatus 40.

The relay node 30 is configured to demodulate received signals transmitted by the first source end and the second source end, perform network coding on the two demodulated signals, encode and modulate the signals after the network coding, and send them to the receiving apparatus 40.

The receiving apparatus 40 is configured to: demodulate a signal transmitted by the first source end that is received to obtain a first log-likelihood ratio; demodulate a signal transmitted by the second source end that is received to obtain a second log-likelihood ratio; demodulate a signal transmitted by the relay node that is received to obtain a third log-likelihood ratio; based on an exclusive OR feature of network coding, process the first log-likelihood ratio, the second log-likelihood ratio, and the third log-likelihood ratio to obtain a posterior log-likelihood ratio of the first source end; and decode the signal transmitted by the first source end that is received by using the posterior log-likelihood ratio of the first source end.

Certainly, it is easily understood that the process in which the receiving apparatus decodes the signal transmitted by the second source end is similar to the process in which the receiving apparatus decodes the signal transmitted by the first source end as follows: based on the exclusive OR feature of network coding, process the first log-likelihood ratio, the second log-likelihood ratio, and the third log-likelihood ratio to obtain a posterior log-likelihood ratio of the second source end; and decode the signal transmitted by the second source end that is received by using the posterior log-likelihood ratio of the second source end.

The specific structure of the receiving apparatus 40 is described in detail in the apparatus embodiment, and is not described herein.

According to the technical solution in the embodiment, for a cooperative communications system where a relay node adopts network coding, based on the exclusive OR feature of network coding, a posterior log-likelihood ratio of a source end is obtained, and the posterior log-likelihood ratio of the source end is used to decode received source end data. In this manner, the characteristics of network coding are fully utilized, yielding more diversity gains, and greatly improving the system performance.

Persons of ordinary skill in the art should understand that all or a part of the steps of the method according to the embodiments may be implemented by a computer program instructing relevant hardware. The program may be stored in a computer readable storage medium. When the program is run, the steps of the method according to the embodiments are performed. The storage medium may be a magnetic disk, an optical disk, a read-only memory (ROM), or a random access memory (RAM).

The above are merely exemplary embodiments for illustrating the present invention, but the protection scope of the present invention is not limited thereto.

What is claimed is:

1. A receiving method in cooperative communications, comprising:

demodulating a first signal received from a local end to obtain a first log-likelihood ratio;

demodulating a second signal received from a relay node to obtain a second log-likelihood ratio, wherein the second signal is a signal obtained by the relay node through network coding the first signal and a third signal received from a peer end;

calculating a prior log-likelihood ratio according to the first log-likelihood ratio and the second log-likelihood ratio;

decoding the second signal by using the prior log-likelihood ratio to obtain the third signal;

obtaining a first prior probability that the first signal transmitted by the local end is 0 and a second prior probability that the first signal transmitted by the local end is 1 according to the first log-likelihood ratio and the second log-likelihood ratio;

calculating a posterior log-likelihood ratio of the first signal according to the first prior probability that the first signal transmitted by the local end is 0 and the second prior probability that the first signal transmitted by the local end is 1; and decoding the first signal by using the posterior log-likelihood ratio of the first signal.

2. The method according to claim 1, wherein the first log-likelihood ratio is calculated according to the following equation:

$$LLR_{m1} = \begin{cases} \beta, & \text{if } m_1 = 1 \\ -\beta, & \text{if } m_1 = 0 \end{cases},$$

wherein $LLR_{m_1}$ indicates the first log-likelihood ratio,
wherein $m_1$ indicates the first signal received from the local end, and
wherein $\beta$ is a positive real number.

3. A receiving apparatus, comprising a demodulator, a processor and a decoder, wherein the demodulator, the processor and the decoder are implemented by hardware,
wherein the demodulator is configured to demodulate a first signal received from a local end to obtain a first log-likelihood ratio, demodulate a second signal received from a relay node to obtain a second log-likelihood ratio, wherein the second signal is a signal obtained by the relay node through network coding the first signal and a third signal received from a peer end;
wherein the processor is configured to calculate a prior log-likelihood ratio according to the first log-likelihood ratio and the second log-likelihood ratio;
wherein the decoder is configured to decode the second signal by using the prior log-likelihood ratio to obtain the third signal;
wherein the processor is further configured to obtain a first prior probability that the first signal transmitted by the local end is 0 and a second prior probability that the first signal transmitted by the local end is 1 according to the first log-likelihood ratio and the second log-likelihood ratio, and calculate a posterior log-likelihood ratio of the first signal according to the first prior probability that the first signal transmitted by the local end is 0 and the second prior probability that the first signal transmitted by the local end is 1; and
wherein the decoder is further configured to decode the first signal by using the posterior log-likelihood ratio of the first signal.

4. The apparatus according to claim 3, wherein the first log-likelihood ratio is calculated using the following equation:

$$LLR_{m1} = \begin{cases} \beta, & \text{if } m_1 = 1 \\ -\beta, & \text{if } m_1 = 0 \end{cases},$$

wherein $LLR_{m_1}$ indicates the first log-likelihood ratio,
wherein $m_1$ indicates the first signal received from the local end, and
wherein $\beta$ is a positive real number.

5. A cooperative communications system, comprising:
a local end;
a peer end;
a relay node; and
a receiving apparatus comprising a demodulator, a processor and a decoder, wherein the demodulator, the processor and the decoder are implemented by hardware,
wherein the demodulator is configured to demodulate a first signal received from the local end to obtain a first log-likelihood ratio, demodulate a second signal received from the relay node to obtain a second log-likelihood ratio, wherein the second signal is a signal obtained by the relay node through network coding the first signal and a third signal received from the peer end;
wherein the processor is configured to calculate a prior log-likelihood ratio according to the first log-likelihood ratio and the second log-likelihood ratio; and
wherein the decoder is configured to decode the second signal by using the prior log-likelihood ratio to obtain the third signal;
wherein the processor is further configured to obtain a first prior probability that the first signal transmitted by the local end is 0 and a second prior probability that the first signal transmitted by the local end is 1 according to the first log-likelihood ratio and the second log-likelihood ratio, and calculate a posterior log-likelihood ratio of the first signal according to the first prior probability that the first signal transmitted by the local end is 0 and the second prior probability that the first signal transmitted by the local end is 1; and
wherein the decoder is further configured to decode the first signal by using the posterior log-likelihood ratio of the first signal.

6. The system according to claim 5, wherein the first log-likelihood ratio is calculated using the following equation:

$$LLR_{m1} = \begin{cases} \beta, & \text{if } m_1 = 1 \\ -\beta, & \text{if } m_1 = 0 \end{cases},$$

wherein $LLR_{m_1}$ indicates the first log-likelihood ratio,
wherein $m_1$ indicates the first signal received from the local end, and
wherein $\beta$ is a positive real number.

* * * * *